United States Patent [19]

Wu

[11] Patent Number: 5,242,519

[45] Date of Patent: Sep. 7, 1993

[54] PROCESS FOR MANUFACTURING A FOAMED LAMINATE

[76] Inventor: Hsien-Chao Wu, No. 25, Ming-Te St., Hua-Tan Ts'un, Hua-Tan Hsiang, Chang-Hua, Hsien, Taiwan

[21] Appl. No.: 783,154

[22] Filed: Oct. 28, 1991

[51] Int. Cl.$^5$ .................. B32B 31/18; B32B 31/20
[52] U.S. Cl. .................. 156/154; 12/142 S; 36/11.5; 156/219; 156/222; 156/267; 428/316.6
[58] Field of Search .............. 156/219, 209, 78, 154, 156/221, 222, 267; 428/316.6; 12/142 S; 36/11.5; 264/46.4

[56] References Cited

U.S. PATENT DOCUMENTS

| | | |
|---|---|---|
| 3,719,549 | 3/1973 | Mittman .................. 156/154 X |
| 4,069,601 | 1/1978 | Robbins et al. .................. 36/11.5 |
| 4,731,139 | 3/1988 | Feyerabend et al. .................. 156/154 |

FOREIGN PATENT DOCUMENTS

| | | | |
|---|---|---|---|
| 260828 | 6/1912 | Fed. Rep. of Germany ...... 156/154 |
| 48-4871 | 2/1973 | Japan .................. 156/267 |
| 54-148868 | 11/1979 | Japan .................. 156/154 |

Primary Examiner—Caleb Weston
Assistant Examiner—Michele K. Yoder
Attorney, Agent, or Firm—Ladas & Parry

[57] ABSTRACT

A process for manufacturing a foamed laminate, which has a plurality of colors, alternating ridges and ridge-confined grooves, includes the steps of (a) superimposing an upper foamed plate having colored stripes, on a lower foamed plate having a single color; (b) pressing the upper and lower foamed plates using an upper and a lower press die to form a laminate, each of the press dies having ridges and ridge-confined grooves; (c) cutting off portions of the upper foamed plate formed at the ridges thereof in order to expose the lower foamed plate; and (d) cutting projections at the lower foamed plate so as to make the lower foamed plate flat.

1 Claim, 6 Drawing Sheets

PROCESS FOR MANUFACTURING A FOAMED LAMINATE

BACKGROUND OF THE INVENTION

1. FIELD OF THE INVENTION

This invention relates to a foamed laminate, more particularly to a process for manufacturing a foamed laminate which has a plurality of colors, alternating ridges and ridge-confined grooves.

2. DESCRIPTION OF RELATED ART

A conventional pair of slippers generally has insoles each of which has a single color and is made of a flat foamed sheet. Since the slipper insoles are flat, they have no ventilating effect when a person wears the slippers. Since the slipper insoles have only one color, they are not attractive or pleasing to the eye.

SUMMARY OF THE INVENTION

Therefore, the objective of this invention is to provide a process for manufacturing a foamed laminate which has a plurality of colors, alternating ridges and ridge-confined grooves. A slipper insole made of this foamed laminate can provide a ventilating effect and has a pleasant appearance.

Accordingly, a process for manufacturing a foamed laminate, which has a plurality of colors, alternating first ridges and ridge-confined first grooves, includes the step of (a) superimposing an upper foamed plate on a lower foamed plate. The lower foamed plate is thicker than the upper foamed plate. The upper foamed plate has a top side and transverse stripes of different colors. The lower foamed plate has a bottom side and a single color. The process of this invention further includes the step of (b) pressing the upper and lower foamed plates together using an upper press die and a lower press die opposite to the upper press die in order to form a laminate. Each of the press dies has a plurality of longitudinal second ridges and longitudinal ridge-confined second grooves with respect to the transverse stripes. The second grooves of the upper press die are respectively aligned with the second ridges of the lower press die. The first ridges and the first grooves are formed at the top side of the upper foamed plate. Spaced projections are formed at the bottom side of the lower foamed plate. The process of this invention finally includes the steps of (c) cutting off portions of the upper foamed plate formed at the first ridges thereof in order to expose the lower foamed plate; and (d) cutting the projections to make the bottom side of the lower foamed plate flat.

BRIEF DESCRIPTION OF THE DRAWING

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
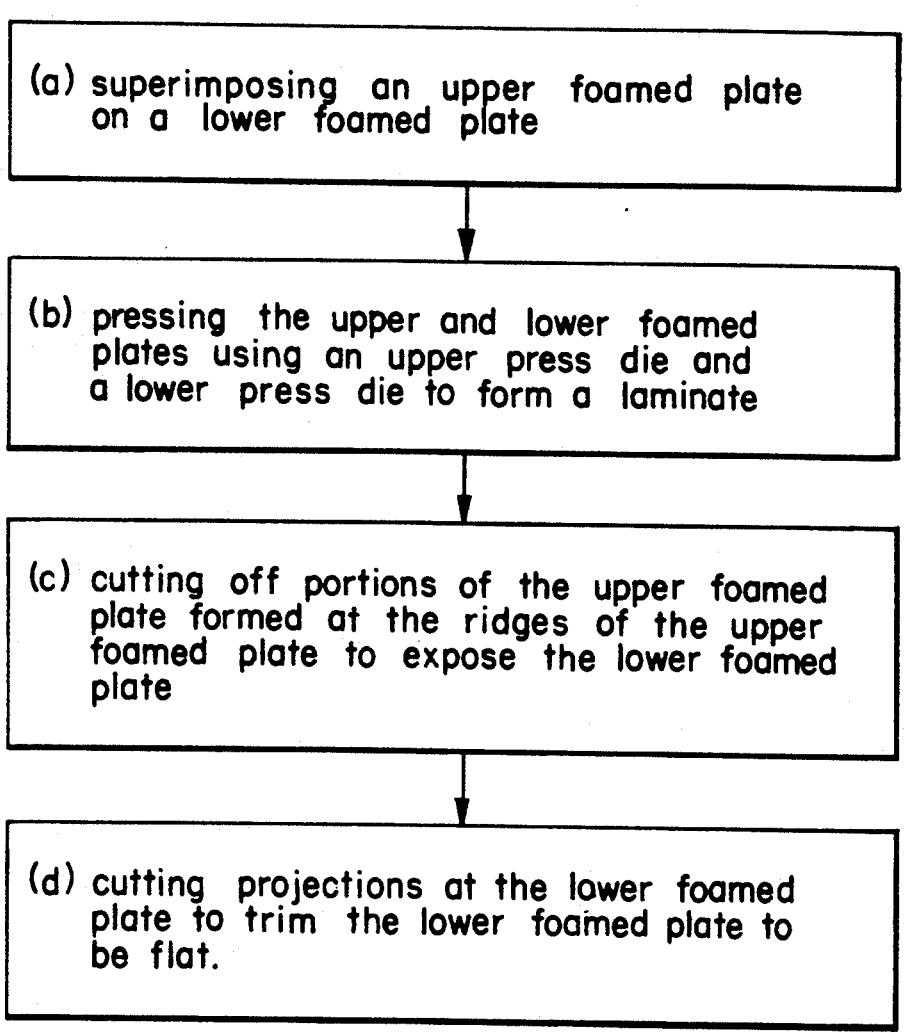
FIG. 1 is a flow chart of a process for manufacturing a foamed laminate of this invention.
Figure 2:
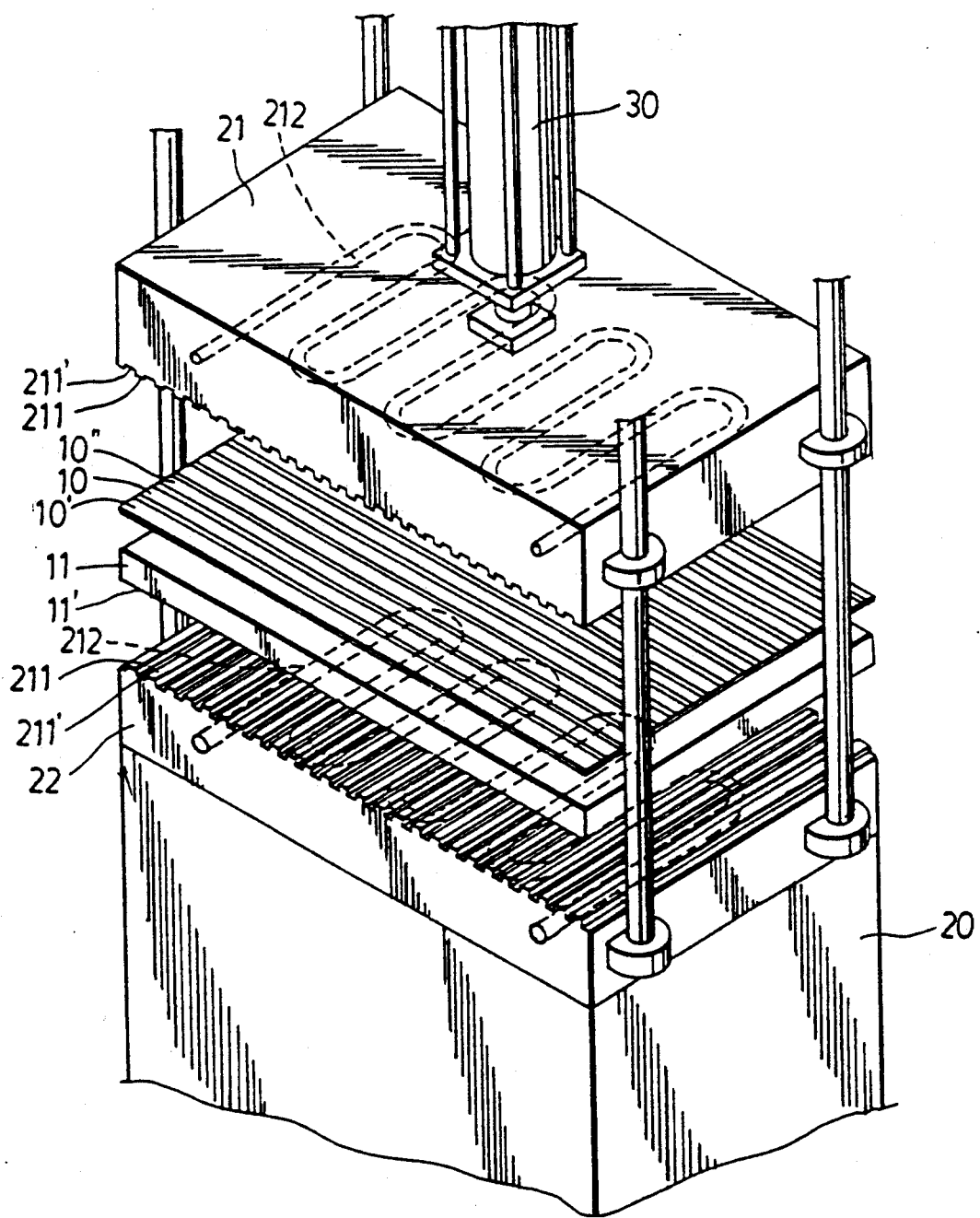
FIG. 2 shows the superimposition of an upper foamed plate on a lower foamed plate and the placement thereof between an upper press die and a lower press die.
Figure 3:
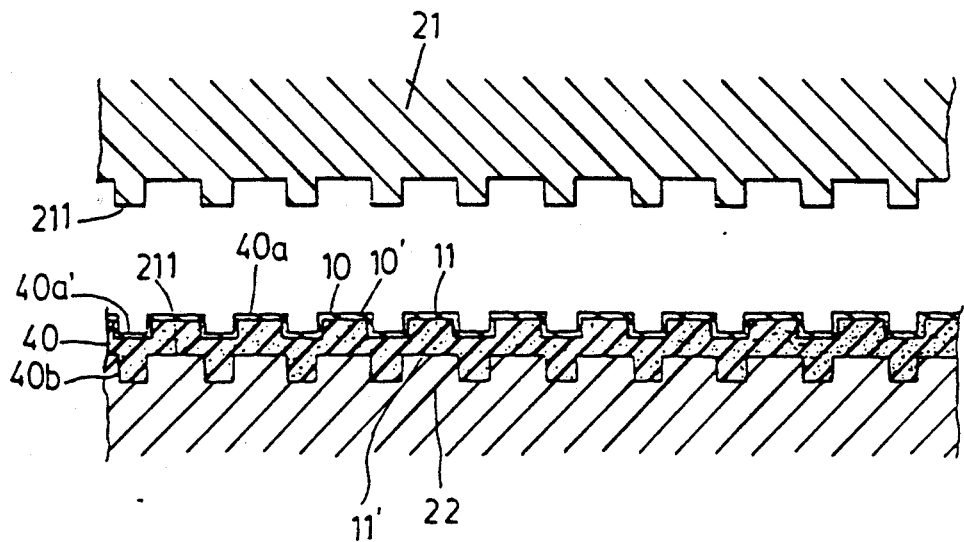
FIG. 3 shows the pressing of the upper and lower foamed plates when using the upper and lower press dies.

Referring to FIGS. 1 to 4, a process for manufacturing a foamed laminate, having a plurality of colors, alternating ridges and ridge-confined grooves, includes the step of (a) superimposing an upper foamed plate (10) on a lower foamed plate (11). The lower foamed plate (11) is thicker than the upper foamed plate (10). The upper foamed plate (10) has a top side (10'), and transverse stripes (10"). The transverse stripes (10") may contain different colors such as red, blue, purple, light blue, yellow, and orange stripes, with black stripes spacing said different colored stripes. The lower foamed plate (11) has a bottom side (11') and is a single color such as black.

A press machine (20) includes an upper press die (21), a lower press die (22) opposite to the upper press die (21), and an activating cylinder member (30) connected to the upper press die (21) to actuate the same downwards and upwards. Each of the upper and lower press dies (21, 22) has a pipe (212) therein which is bent in 180° switchbacks. Each of the upper and lower press dies (21, 22) has a plurality of longitudinal ridges (211') and longitudinal ridge-confined grooves (211') with respect to the transverse stripes (10"). The grooves (211') of the upper press die (21) are respectively aligned with the ridges (211) of the lower press die (22). The second step of this invention (b) includes pressing the upper and lower foamed plates (10, 11) together using the upper and lower press dies (21, 22) in order to form a laminate (40). The pressing step (b) further includes hot pressing the upper and lower foamed plates (10, 11) by supplying hot water into the pipes (212), and thereafter cooling the upper and lower foamed plates (10, 11) by supplying cool water into the pipes (212). After the pressing step (b), the top side (10') of the upper foamed plate (10) is formed with alternating ridges (40a) and grooves (40a'). The bottom side (11') of the lower foamed plate (11) is formed with spaced projections (40b).

Figure 5:
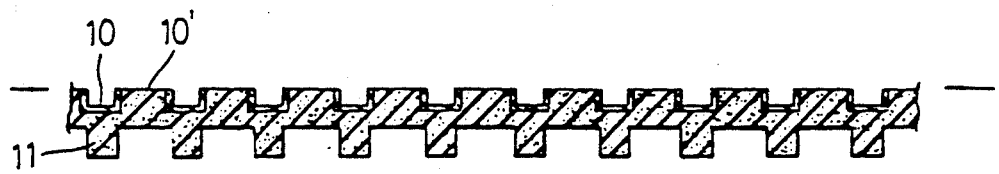
FIG. 5 shows the cutting off of portions of the upper foamed plate at the ridges thereof in order to expose the lower foamed plate.
Figure 6:
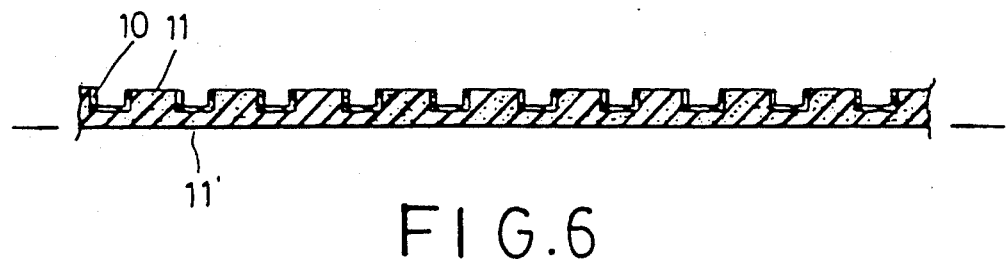
FIG. 6 shows the cutting of the projections so as to make the bottom side of the lower foamed flat.
Figure 4:
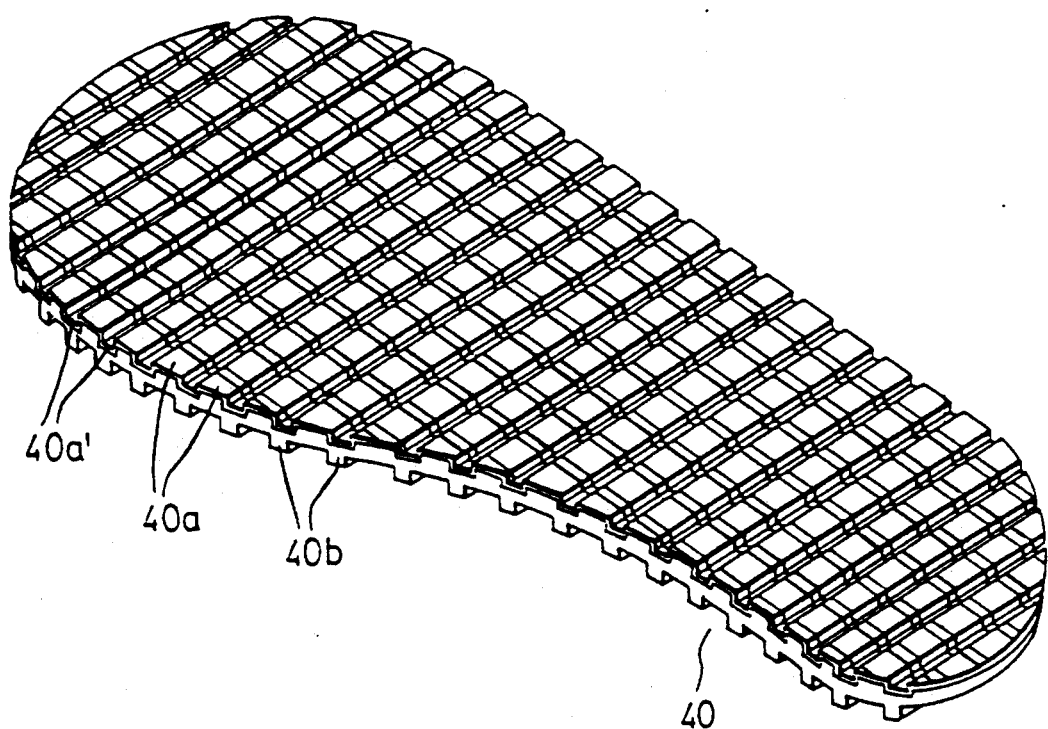
FIG. 4 is a perspective view of the foamed laminate formed by a pressing step of this invention.

Referring to FIGS. 5 and 6, the process of this invention further includes the steps of (c) cutting off portions of the upper foamed plate (10) at the ridges (40a) thereof in order to expose the lower foamed plate (11), and (d) cutting the projections (40b) so as to make the bottom side (11') of the lower foamed plate (11) flat.

Figure 7:
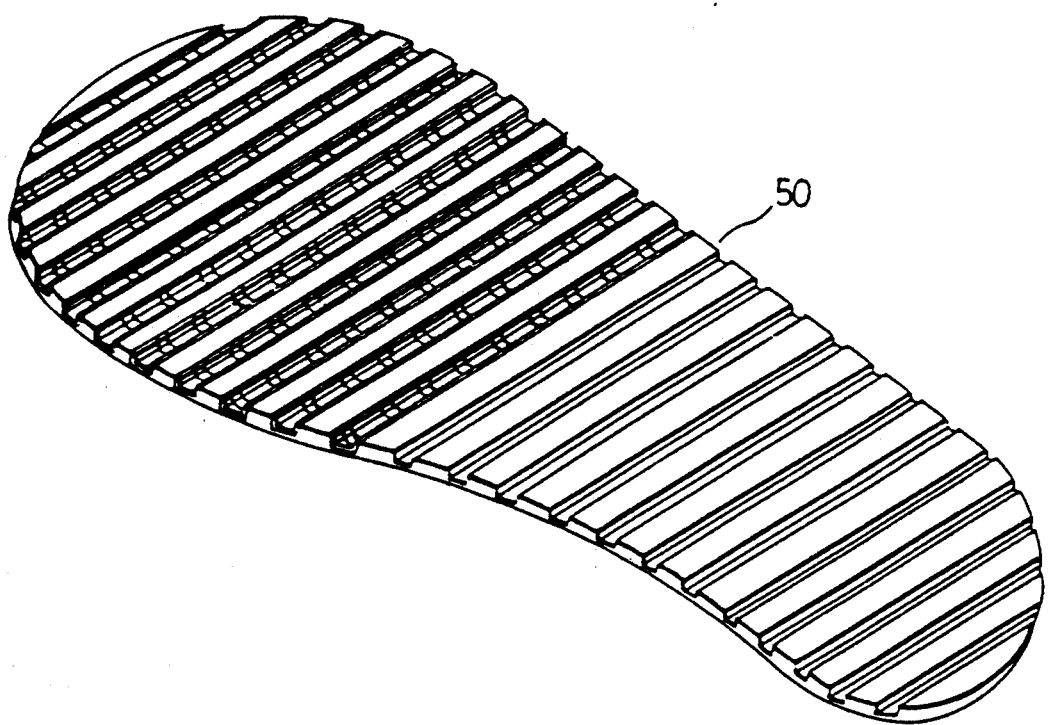
FIG. 7 is a perspective view of the foamed laminate formed by this invention.
Figure 8:
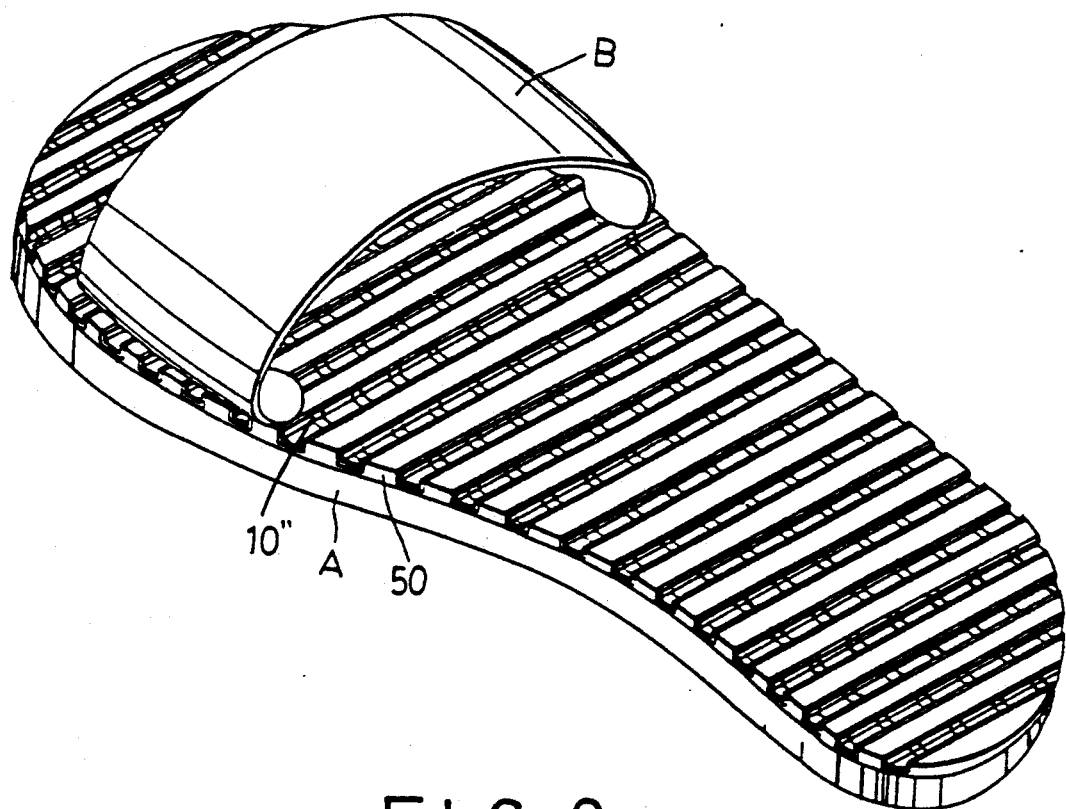
FIG. 8 shows the foamed laminate manufactured by this invention applied to a slipper insole.

Referring to FIG. 7, a foamed laminate (50) manufactured by this invention is formed. Referring to FIG. 8, the foamed laminate (50) is applied to a slipper insole. An outsole (A) is bound to the foamed laminate (50). A strap (B) is attached to the foamed laminate (50). Therefore, a slipper is formed. A slipper insole made of this foamed laminate (50) can provide a ventilating effect and has a pleasant appearance due to the ridges (40a), grooves (40a') and colored stripes (10").

While the present invention has been described in connection with what is considered the most practical and preferred embodiment, it is understood that this invention is not limited to the disclosed embodiments, but is intended to cover various arrangements included within the spirit and scope of the broadest interpretations and equivalent arrangements.

I claim:

1. A process for manufacturing a foamed laminate, said foamed laminate having alternating first ridges and ridge-confined first grooves, said first ridges being parallel to one another and having a single color, said first grooves being parallel to one another, each of said first grooves having a plurality of stripes of different colors, said stripes of said first grooves being transverse with respect to said first grooves, said stripes of one of said first grooves being respectively aligned with those of an adjacent one of said first grooves, said stripes which are aligned with one another being of a single color, said process comprising the steps of:

(a) superimposing an upper foamed plate on a lower foamed plate to form a two-layer laminate, said lower foamed plate having a top portion and a bottom portion and being thicker than said upper foamed plate, said upper foamed plate having a plurality of transverse stripes of different colors, said lower foamed plate having a single color;

(b) pressing said two-layer laminate by placing said two-layer laminate between an upper press die and a lower press die opposite to said upper press die, each of said upper and lower press dies having a plurality of longitudinal second ridges and longitudinal ridge-confined second grooves, said second grooves of said upper press die being respectively aligned with said second ridges of said lower press die, said second ridges of said upper press die being respectively aligned with said second grooves of said lower press die, each of said second grooves of said upper press die having a depth larger than the thickness of said upper foamed plate, said first ridges and said first grooves being formed at said upper foamed plate and said top portion of said lower foamed plate of said two-layer laminate and spaced parallel projections being formed at said bottom portion of said lower foamed plate during pressing;

(c) cutting off portions of said foamed plate, which portions are formed at said first ridges of said two-layer laminate to expose said lower foamed plate; and (d) cutting off said projections of said lower foamed plate to smooth said bottom portion of said lower foamed plate flat.

* * * * *